(12) United States Patent
Wang et al.

(10) Patent No.: US 11,392,806 B2
(45) Date of Patent: Jul. 19, 2022

(54) DIFFERENTIABLE RASTERIZER FOR VECTOR FONT GENERATION AND EDITING

(71) Applicant: ADOBE INC., San Jose, CA (US)

(72) Inventors: Zhaowen Wang, San Jose, CA (US); Zhifei Zhang, San Jose, CA (US); Xuan Li, Philadelphia, PA (US); Matthew Fisher, San Jose, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 70 days.

(21) Appl. No.: 16/788,781

(22) Filed: Feb. 12, 2020

(65) Prior Publication Data

US 2021/0248432 A1    Aug. 12, 2021

(51) Int. Cl.
*G06N 3/02* (2006.01)
*G06N 3/08* (2006.01)
*G06K 15/02* (2006.01)

(52) U.S. Cl.
CPC ................. *G06K 15/1836* (2013.01)

(58) Field of Classification Search
USPC .............. 358/1.1–3.29, 1.11–1.18, 530–539; 382/154–228, 253–308
See application file for complete search history.

(56) References Cited

U.S. PATENT DOCUMENTS

| | | | | |
|---|---|---|---|---|
| 6,298,171 B1* | 10/2001 | Lorton | ................... | G06K 7/143 235/494 |
| 8,718,369 B1* | 5/2014 | Tompkins | ........... | G06F 16/5838 382/181 |
| 2005/0067498 A1* | 3/2005 | Smith | ................ | G06K 15/1849 235/494 |
| 2013/0179834 A1* | 7/2013 | Begeja | .................. | G06F 16/532 715/810 |
| 2019/0138860 A1* | 5/2019 | Liu | .......................... | G06K 9/66 |
| 2019/0147304 A1* | 5/2019 | Liu | ...................... | G06K 9/6227 382/157 |
| 2021/0118207 A1* | 4/2021 | Kumawat | ............. | G06F 40/109 |
| 2021/0181754 A1* | 6/2021 | Cui | ........................ | G06N 3/084 |

OTHER PUBLICATIONS

Liu, S., Li, T., Chen, W., & Li, H. (2019). Soft rasterizer: A differentiable renderer for image-based 3d reasoning. In Proceedings of the IEEE International Conference on Computer Vision (pp. 7708-7717).

Lopes, R. G., Ha, D., Eck, D., & Shlens, J. (2019). A learned representation for scalable vector graphics. In Proceedings of the IEEE International Conference on Computer Vision (pp. 7930-7939).

* cited by examiner

*Primary Examiner* — Marcellus J Augustin
(74) *Attorney, Agent, or Firm* — Shook, Hardy & Bacon L.L.P.

(57) ABSTRACT

Systems and methods provide for generating glyph initiations using a generative font system. A glyph variant may be generated based on an input vector glyph. A plurality of line segments may be approximated using a differentiable rasterizer with the plurality of line segments representing the contours of the glyph variant. A bitmap of the glyph variant may then be generated based on the line segments. The image loss between the bitmap and a rasterized representation of a vector glyph may be calculated and provided to the generative font system. Based on the image loss, a refined glyph variant may be provided to a user.

20 Claims, 11 Drawing Sheets

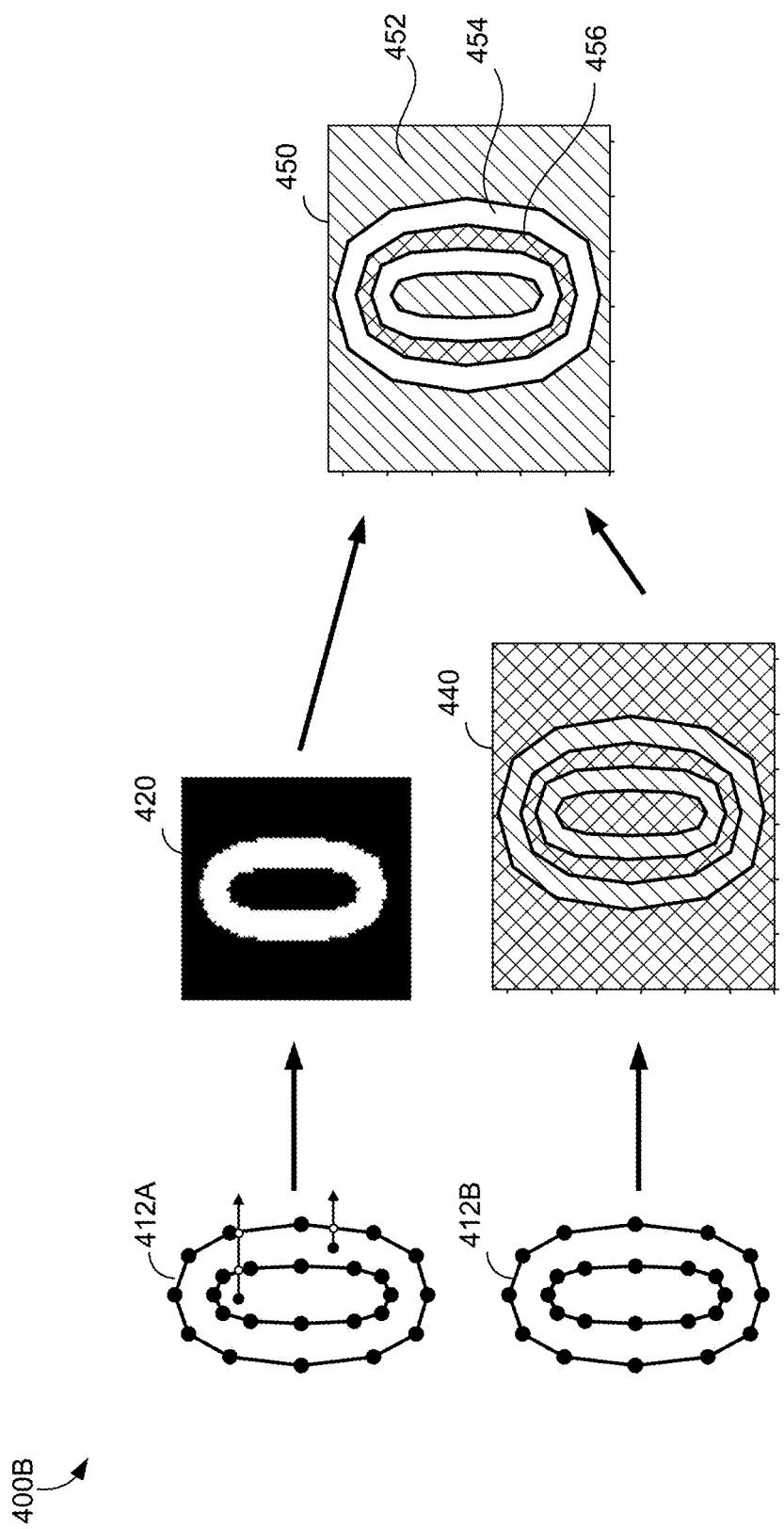

DIFFERENTIABLE RASTERIZER FOR VECTOR FONT GENERATION AND EDITING

BACKGROUND

Font designers often rely on pre-generated fonts as a starting point when designing new fonts. As fonts are often one of the core design concepts, font design is often an important part of a project design pipeline. Automatic font generation models can quickly provide designers with glyph variants for new font styles using existing fonts. Font designers may then use these glyph variants as a starting point for creating a complete font. Depending on the tone the designer intends for the font, the designer may change some font features and not others.

SUMMARY

Various aspects of the technology described herein are generally directed to systems, methods, and computer storage media, for among other things, providing font designers with high-quality glyph variants by employing an efficient and effective method of generating glyph variants by determining the variance between a vector glyph and a generated variation of that glyph. In particular, a generative font system in a computing environment according to the present disclosure may generate a refined glyph variant using a neural network that may be trained using the calculated loss from comparing a two-dimensional (2D) differentiable raster image of a glyph variant to a bitmap representing an original vector image. The operations of the present technology are executed to allow for a pixel to pixel comparison between a differentiable raster image and a ground truth image. In this way, the generative font system and method of the present disclosure supports determining the global loss between a glyph variant and a vector glyph. The present system and method can also support the addition of auxiliary losses to fine-tune control points of a glyph variant. In this regard, losses determined by the generative font system may be used to train a neural network for generating glyph variants. Further, in order to generate high-quality glyph variants, it is important to provide neural networks with accurate and comprehensive data to train the neural network, which conventional neural network models trained to generate image variants have failed to provide thus far.

By way of background, machine learning or deep learning can be used to train neural network models to perform various tasks, including generating images. Training a generative neural network model can be accomplished by fine-tuning weights of parameters of the model using the gradient of a calculated loss (e.g., error rate), which may be obtained from results of a previous iteration (e.g., input-output example) of the model. The gradient is used in a gradient descent optimization algorithm used to minimize a function by iteratively moving in the direction of steepest descent as defined by a negative of the gradient. In machine learning, gradient descent is used to update the parameters of a model. Parameters refer to coefficients in linear regression and weights in neural networks. This process, known as backpropagation, minimizes error rates, making a model more reliable. Generally, a loss function provides a method of evaluating the accuracy of a neural network model. For example, if predictions from the model deviate greatly from actual results, a loss function will calculate a large loss to indicate the model is not very accurate. Accurate loss calculations are crucial to properly fine-tune parameter weights and train the neural network model. Further, depending on the intended use of a given model, a certain degree of loss is desirable. For example, when generating a new image based on an original image, loss equates to feature variations, which are inherently necessary to generate the new image. However, if the degree of loss is too large, the model may generate images haphazardly, resulting in low-quality images with discontinuities. As such, proper training using accurate loss calculations is required to generate high-quality images.

Conventional machine learning models that support generating new images lack support for generating differentiable two-dimensional (2D) images. In one conventional implementation, a neural network models allow for generating three-dimensional (3D) image renderings by directly rendering a given mesh using differentiable functions. The mesh provides texture to image renderings. The texture allows the image rendering to be differentiable, which enables loss calculations for purposes of backpropagation and model training. For example, given an 3D input image, a triangle mesh is generated to define the boundary of the image and calculate the distance for each pixel to the boundary. However, 2D images often lack significant texture. This is especially true when the 2D image is a single color. For example, 2D glyphs are mostly black and white and, as such, lack any sort of texture. Moreover, while triangular meshes are discrete, curves of a 2D image may be continuous. The continuous curves make calculating relative boundary distances more difficult.

In another conventional implementation, a machine learning technique may allow for building sequential generative models for 2D vector graphics, such as vector glyphs. Vector fonts, including vector glyphs of a vector font, use Bezier curves, drawing instructions (e.g., moveTo commands) and mathematical formulas that form a collection of line start and end points to define line segments that a computing system can use to draw a character or symbol (i.e., glyph). Some conventional systems allow for generating moveTo commands with random variations in an attempt to create a glyph variant. For example, a sequential stochastic model may randomly generate drawing instructions with random endpoint variations based on an input vector glyph. However, while these random endpoint variations may result in new image renderings, errors may also accumulate resulting in rendering mistakes that may be difficult for a font designer to correct. For at least these reasons, there are numerous occasions where font designers simply will not or are not able to take advantage of image variants that would help them better create new font designs.

Aspects of the technical solution described in the present disclosure are directed towards improving generated 2D glyph variants (e.g., images) by providing a differentiable image rasterizer in a generative font system in a computing environment. In particular, the present differentiable image rasterizer of the generative font system may approximate polylines of an image and render contours of a glyph variant to generate a bitmap of the glyph variant. The bitmap of the glyph variant may then be compared against a rasterized representation of a vector glyph (e.g., ground truth image) to calculate an image loss. This image loss may then be used to train a neural network of the generative font system. In operation, a font initiator of the generative font system may receive an image representative of a vector glyph and generate, using a generative neural network, a glyph variant based on the vector glyph. Vector glyphs and glyph variants may be scalable vector graphics (SVG) images and may be received, generated, and/or saved as .svg, .svgz or any other suitable filename extension. SVG is an XML-based vector image format for two-dimensional graphics. The glyph variant may be provided to a differentiable rasterizer which may include a polyline sampler and a contour renderer. Using the differentiable rasterizer, a plurality of line segments may be approximated for the glyph variant, where the plurality of line segments may be representative of contours of the glyph variant. Further, the differentiable rasterizer may generate a bitmap based on the plurality of line segments. To determine the accuracy of the generated glyph variant, an image loss of the glyph variant may be calculated based on a comparison of the bitmap of the glyph variant to a rasterized representation of the vector glyph. This image loss may then be provided to the generative neural network (e.g., font initiator) and, based on the provided image loss, a refined glyph variant may be generated by the generative neural network. Advantageously, the generative font system may enable many applications, such as new font synthesis, font glyph completion, font interpolation, and editing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A-4B illustrate an exemplary contour renderer for generating a bitmap of a glyph variant, in accordance with embodiments of the present invention;

DETAILED DESCRIPTION

Figure 1:
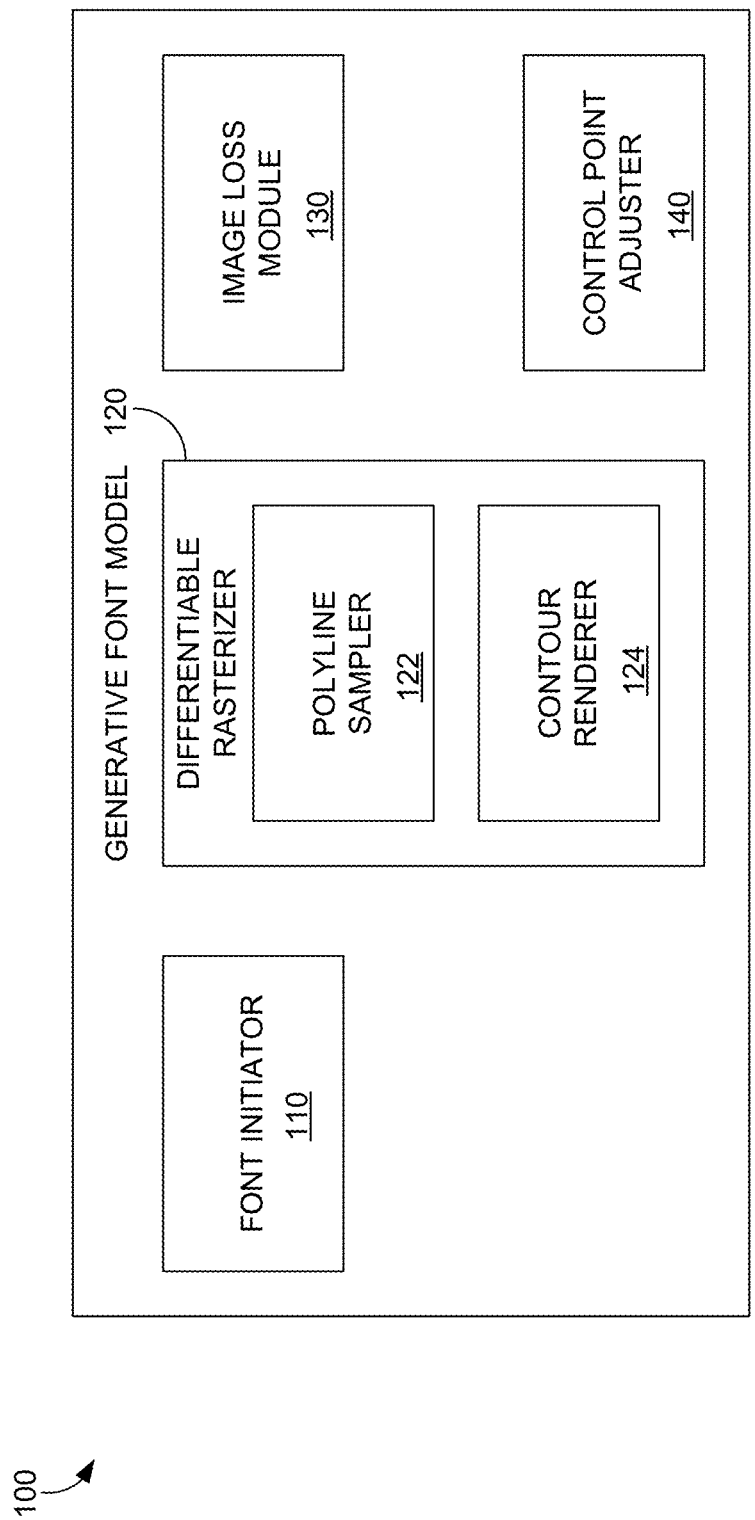
FIG. 1 illustrates an exemplary technical solution environment suitable for implementing embodiments of the present invention.

Automatic font generation models can quickly provide designers with glyph variants for new font styles using existing fonts. In some 3D image generating models, in order to calculate the loss between a generated image and a ground truth image, a triangle mesh is generated to define the gradient of the generated image. However, 2D images often lack significant texture when the 2D image is a single color. While triangular meshes are discrete, curves in a 2D image may be continuous making calculating relative boundary distances and gradients more difficult.

As described above, machine learning or deep learning can be used to train neural network models to minimize loss by computing the gradient of a calculated loss (e.g., error rate) obtained from results of a previous iteration (e.g., input-output example) of the model. The gradient is necessary in order to fine-tune the accuracy of a neural network model. Further, while minimal losses are generally indicative of an accurate model, a certain degree of loss (e.g., inaccuracy) may be desirable depending on the intended use of a given model. As such, providing the gradient of a calculated loss allows for properly training a neural network model and setting a level of acceptable loss, which is required to generate high-quality images.

A glyph refers to a specific instance or rendering (e.g., shapes) of a character, symbol or other grapheme (e.g., smallest meaningful unit of a writing system of any given language) in a font, where each glyph has different typographic features applied. Each font in a typeface (i.e., font family) comprises a set of glyphs, which have a similar weight, style, condensation, width, slant, italicization, ornamentation, and designer. As used herein, raster fonts consist of pixels representing the image (e.g., bitmap) of each glyph in each typeface and size. In contrast, vector fonts use Bezier curves, drawing instructions and mathematical formulas that form a collection of line endpoints that define line segments a computing system can use to draw a glyph. Generally, font designers work with vector glyphs as most glyphs are stored as scalable vector graphics (SVG) files. Font designers often rely on pre-generated fonts or glyphs to use as a starting point when designing new fonts. Depending on the tone or use case the designer intends for the font, the designer may change some font features and not others. While there are generative models that can provide designers with a latent space of font styles, conventional generative models typically generate font glyphs using randomly generated sequential drawing instructions, which can result in poor quality glyphs due to the accumulation of errors. For example, conventional models tend to have a difficult time learning characters with long sequence lengths because the variance of log likelihood increases. Thus, designers wishing to use generated glyph variants as a starting point for a new font may need to correct poor-quality glyph variants, which can be a tedious and time-consuming effort. As fonts are often one of the core-design concepts, high-quality automatic font generation would be very useful in design pipelines.

Conventional machine learning models that support generating new images lack support for generating differentiable two-dimensional (2D) images. In one conventional implementation, some neural network models allow for generating three-dimensional (3D) image renderings by directly rendering a given mesh using differentiable functions. The mesh provides texture to image renderings. The texture allows the image rendering to be differentiable, which enables loss calculations for purposes of backpropagation and model training. For example, given a 3D input image, a triangle mesh is generated to define the boundary of the image and calculate the distance for each pixel to the boundary. However, 2D images often lack significant texture. This is especially true when the 2D image is a single color. For example, 2D glyphs are mostly black and white and, as such, lack any sort of texture. Moreover, while triangular meshes are discrete, curves of a 2D image may be continuous. The continuous curves make calculating relative boundary distances more difficult.

In another conventional implementation, some machine learning techniques may allow for building sequential generative models for 2D vector graphics, such as vector glyphs. Vector fonts, including vector glyphs of a vector font, use Bezier curves, drawing instructions (e.g., moveTo commands) and mathematical formulas that form a collection of line start and end points to define line segments that a computing system can use to draw a character or symbol (i.e., glyph). A conventional system may allow for generating moveTo commands with random variations in an attempt to create a glyph variant. For example, a sequential stochastic model may randomly generate drawing instructions with random endpoint variations based on an input vector glyph. However, while these random endpoint variations may result in new image renderings, errors may also accumulate resulting in rendering mistakes that may be difficult for a font designer to correct. For at least these reasons, there are numerous occasions where font designers simply will not or are not able to take advantage of image variants that would help them better create new font designs.

Accordingly, embodiments of the present invention are directed to streamlined and efficient methods, systems, and computer storage media for generating glyph variants using a generative neural network model that is trained to provide font designers with high-quality glyph variants that may be used when creating new font designs. In particular, a generative font system may convert a glyph variant to a differentiable glyph variant based on rasterizing the glyph variant and may further calculate the loss for a glyph variant by comparing it against a ground truth vector glyph. Advantageously, with the present invention, rasterizing a glyph variant to generate a differentiable glyph variant allows for calculating the global loss between the glyph variant and a ground truth vector glyph. In contrast, some conventional systems calculate the loss at each endpoint as each endpoint is sequentially generated, which can result in inaccurate loss calculations due to the accumulation of small errors. Due to the accumulation of errors, such a generated glyph may actually be a low quality glyph variant with discontinuities, lack of symmetry, or be otherwise visually unappealing. By calculating the global loss according to the present disclosure, the generative neural network model may provide a more accurate loss calculation and may mitigate against the accumulation of errors when compared to conventional systems (e.g., sequential stochastic models). Moreover, the rasterization process of the present invention enables the system to calculate the gradient of the global loss of the glyph variant, which may be backpropagated through the generative font system to further fine-tune parameter weights and train the system in order to provide high-quality glyph variants.

At a high level, some implementations of the technology described herein may be used to improve the quality of generated 2D glyph variants by providing differentiable glyph variants. In particular, an image rasterizer may sample several polylines of a glyph variant and render the contours of the glyph variant, which may be used to generate a pixel map (e.g., bitmap) of the glyph variant. Based on this rasterization process, the pixel map of the glyph variant may then be compared against a ground truth glyph to calculate the image loss between the two, which may then be backpropagated to train a generative font system. Advantageously, the generative font system may enable applications such as new font synthesis, font glyph completion, font interpolation, and editing.

Aspects of the technical solution can be described by way of examples and with reference to FIG. 1. FIG. 1 illustrates an exemplary technical solution environment suitable for implementing embodiments of the present technical solution. Generally, the technical solution environment includes a technical solution system for font generation operations using an image rasterizer. With reference to FIG. 1, the generative font system 100 includes a font initiator 110, operable to generate glyph variants based on an input vector glyph. The system 100 also includes a differentiable rasterizer 120. The differentiable rasterizer includes a polyline sampler 122 and a contour renderer 124. The generative font system 100 also includes an image loss module 130 and a control point adjuster 140. The font generation operations of the technical solution described herein support generating glyph initiations. The font generation operations are implemented using a generative font system (i.e., font initiator 110, rasterizer 120, image loss computer 130, and endpoint adjuster 140) that supports font generation operations that are executed to generate high-quality fonts by enabling a user to generate glyph initiations based on existing glyphs and by providing differentiable rasterized glyph images.

The font initiator 110 supports receiving a vector glyph and generating a glyph variant based on the received vector glyph. Glyph variants generated by the font initiator 110 may appear substantially similar to the received vector glyph. However, features of the vector glyph variant may be altered by the font initiator to varying degrees to generate a variation (i.e., glyph variant) of the received vector glyph. In this way, new glyphs may be generated and used as a starting point for font designers. The differentiable rasterizer 120 supports rasterizing vector glyphs and vector glyph variants. For purposes of rasterizing, differentiable rasterizer 120 may process both vector glyphs and glyph variants similarly or individually. As such, only the process for rasterizing glyph variants will be discussed in the present disclosure. However, the process may be performed in like manner on any vector glyph or other 2D vector image.

The polyline sampler 122 of the differentiable rasterizer 120 supports receiving a glyph variant and approximating the contours of the glyph variant. Contours may be approximated by sampling a fixed number of points uniformly along each curve of the glyph variant to aid in rendering contours. For example, if a curve is a line, the polyline sampler may set two control points at the ⅓ point and ⅔ point on the line. Each of the contours of the image may be approximated, using the polyline sampler 122 of the differentiable rasterizer 120, with several line segments to create one or more continuous lines to generate the glyph shape. The one or more continuous lines are representative of the contours of the glyph variant. Based on the approximated contours, a mask may be created to indicate which segments were created from virtual curves using, for example, moveTo commands from the glyph variant, and which segments are actual curves approximated by the polyline sampler.

The contour renderer 124 of the differentiable rasterizer 120 supports generating a bitmap of a glyph variant. The contour renderer 124 generates the bitmap representative of the glyph variant by receiving the mask created by the polyline sampler 122 and determining the location of pixels relative to the mask. For example, the contour renderer 124 may determine which pixels are inside the shape of the glyph variant and which pixels are outside the shape of the glyph variant using a ray surface intersection test, such as a ray casting algorithm. Using a ray surface intersection test, the contour renderer may emit a ray to the right (or in any direction) of each pixel. Ray intersections with the mask, including actual and virtual curves, may be counted. Whether a pixel is inside the glyph variant shape may be determined based on whether the number of ray intersections (excluding virtual curves) is an odd number. Virtual curves are included and later excluded in the ray intersection test to allow for tensor broadcasting, which may accelerate computations.

Further, the contour renderer 124 supports determining the distance from each pixel to contours generated by the polyline sampler 122. The distance from each pixel to a contour may be determined by computing the squared distance from each pixel to both the virtual and the actual segments of the mask. The square distance from a pixel to a curve is the minimum among the distances to all actual segments, excluding virtual segments. As mentioned above, virtual segments are included and later excluded to allow for tensor broadcasting, which may accelerate computations. The square distance may be used to estimate the border of the glyph variant. Further the distance may be clamped by a user-defined threshold. Based on a combination of the squared distance and the inside-outside mask, the contour renderer may generate a bitmap that represents the glyph variant. The bitmap data may be stored as a signed distance field, negating the values defined on outside pixels in the inside-outside mask as discussed in more detail below in FIG. 4B. Typically, pixel values in a signed distance field represent the distance to the nearest non-black pixel in the source image. Pixels outside of the shape have positive distance values, while pixels inside the shape have negative distance values, hence the "signed" part of the name. Lastly, to generate the final bitmap, (i.e., rasterized representation of the glyph variant), the contour renderer may normalize the values of the signed distance field into a zero to one range. Advantageously, the process of generating a bitmap based on approximating curves of the vector glyph with the contour renderer and generating a signed distance field provides a differentiable raster image of the glyph variant that may be used to calculate a gradient for training the font initiator 110.

The image loss module 130 supports calculating an image loss of the glyph variant based on a comparison of a bitmap of the glyph variant to a rasterized representation of the vector glyph (e.g., bitmap of the vector glyph). To compare the bitmap of a glyph variant and the rasterized representation of the vector glyph, each of the images may be rendered in a common view port and compared using a pixel to pixel comparison. As used herein, a viewport is an area in computer graphics which may render device specific coordinates (e.g. pixels for screen coordinates, in which an image may be rendered). As the coordinates for the viewport are constant for the image pair, the global loss may be calculated between the bitmap of the glyph variant and the rasterized representation of the vector glyph. A loss function may compute the loss (e.g., variance) between the image pair and determine a gradient. For example, an L2 loss function may be used to measure distances between the image pair, counting pixels to determine errors. The computed loss between the image pairs and gradient for the loss may then be backpropagated into the font initiator 110 to train and fine-tune the generative font model. For example, the output of image loss module 130 may be inserted into a current step's LTSM (Long Short Term Memory) of the font initiator 110 to fine-tune the model. Additional aspects of the technical solution of the present invention are described below, by way of exemplary implementations, with reference to technical solution environments.

The control point adjuster 140 supports adjusting the location of an endpoint of a glyph variant. For example, curve endpoints that connect sharply may be rectified to straighten and smooth curves. To rectify the curve endpoints, the control point adjuster 140 may compute a tangent line for each curve on either side of the endpoint. At the endpoint, where the two tangent lines meet, a rectifier may compute the cosine value of the angle generated by the intersection of the tangent lines. For example, as the angle increases from 90° to 180°, the cosine increases in magnitude, but is now a negative value. Thus, the cosine goes from 0 to −1 as the angle approaches 180°. Therefore, to rectify sharp curves, endpoints may be adjusted such that the cosine approaches −1. Advantageously, these adjustments may be used to further improve the quality of glyph variants.

Figure 2:
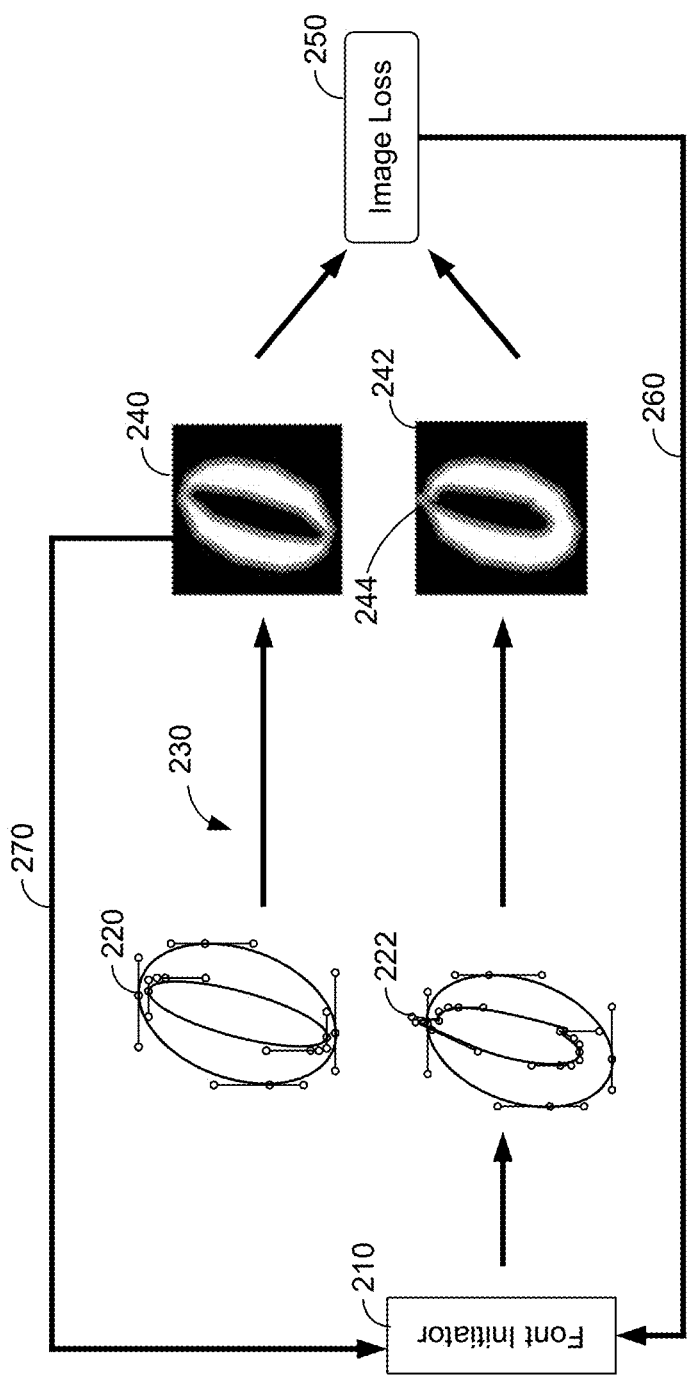
FIG. 2 illustrates the process for generating a glyph variant, rasterizing the glyph variant, rasterizing a vector glyph and calculating image loss, in accordance with embodiments of the present invention.

With reference to FIG. 2, FIG. 2 is a drawing illustrating the process for generating a glyph variant, rasterizing the glyph variant, rasterizing a vector glyph and calculating image loss between the glyph variant and the vector glyph according to the present disclosure as described above in connection with FIG. 1. FIG. 2 shows font initiator 210, vector glyph 220, bitmap 240, bitmap 242, and image loss module 250. In operation, font initiator 210 may receive bitmap 240 as an input and generate glyph variant 222, as indicated at 270. Through the differentiable rasterization process described above in in connection with FIG. 1 and in more detail below in FIG. 3, bitmap 240 and bitmap 242 may be generated as indicated at 230. Any errors generated by the font initiator 210 in glyph variant 222 may be captured in the rasterization process. For example, when bitmap 240 is visually compared to bitmap 242, bitmap 242 shows error 244. A degree of error (e.g., variation) may be expected and desired from the font initiator. To calculate the degree of error, also known as image loss between bitmap 240 (e.g., operating as ground truth) and bitmap 242, each of the bitmaps are received by the image loss module 250 and compared. Variances between the pixels of vector glyph 220 and glyph variant 220 may be determined globally (e.g., for each pixel after sampling is complete) for each bitmap. Based on an appropriate loss function, the image loss is computed and backpropagated 260 to the font initiator 210. Advantageously, given the font initiator (e.g., neural network) and the appropriate loss function, backpropagating may calculate the gradient of the loss with respect to parameter weights within the neural network of the font initiator 210, which may be used to fine-tune the neural network.

Figure 3:
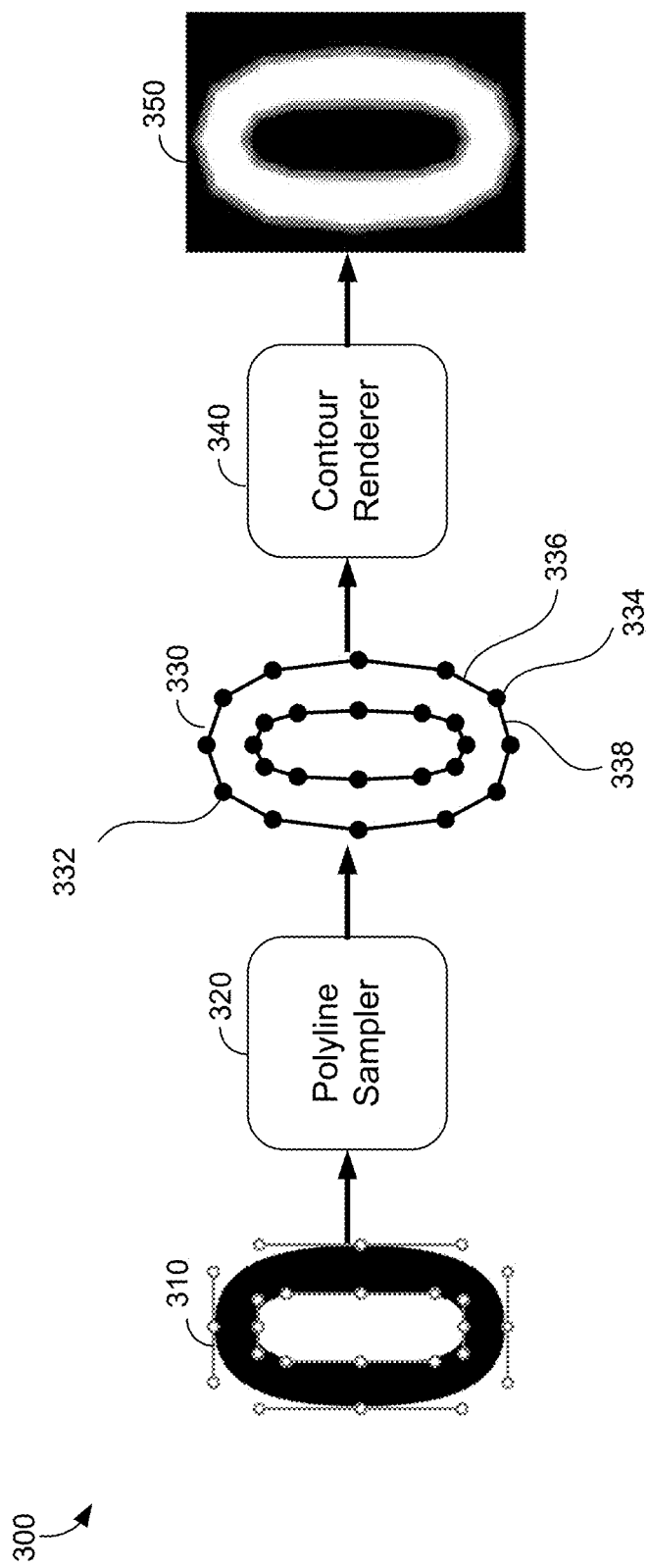
FIG. 3 illustrates the differentiable rasterization process, in accordance with embodiments of the present invention.

With reference to FIG. 3, FIG. 3 illustrates the differentiable rasterization process according to the present disclosure as described above in connection with FIG. 1. FIG. 3 shows glyph variant 310, polyline sampler 320, approximated glyph variant 330, contour renderer 340, and bitmap 350. Contours of glyph variant 310 may be approximated by sampling a fixed number of points uniformly along each curve. For example, the polyline sampler 320 may set control points 332 and 334. Subsequently, by connecting each of the control points with several line segments, contours of the glyph variant may be approximated. Line segment control points may share a memory when the start point of a line segment and the endpoint of a different line segment have the same control point. For example, the start-point of line segment 336 is control point 334, which is the same as the endpoint for line segment 338. By allowing the control points of these line segments to share a memory, contour renderer may create a closed shape for the approximated glyph variant 330. Further, polyline sampler 320 may create virtual curves for the glyph variant 310.

Figure 4A:
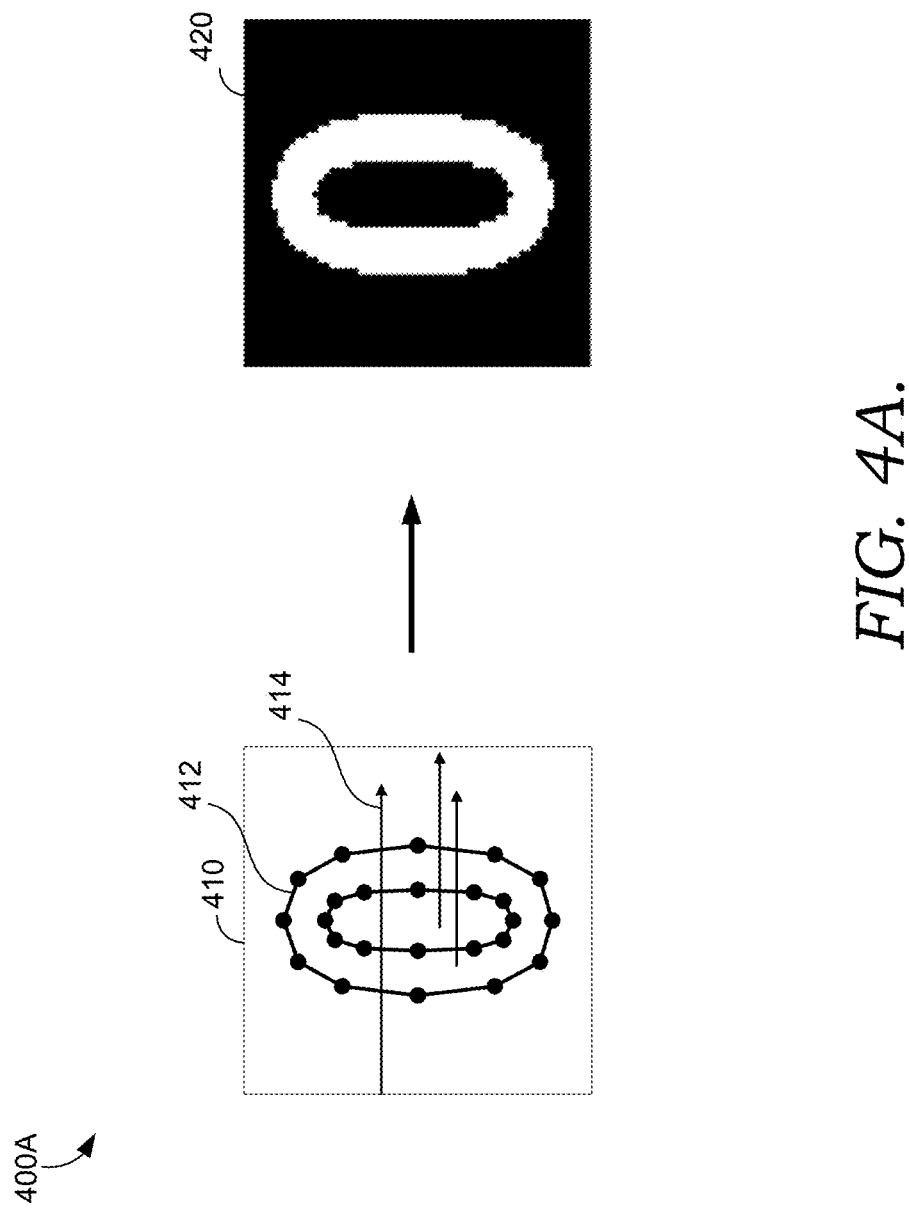

Virtual curves are generated using moveTo commands. As the font initiator of the present disclosure may generate the glyph variant as a scalable vector graphic, moveTo commands may be included with the glyph variant file to provide necessary rendering instructions for generating virtual curves for the glyph variant. Based on the virtual curves and the contours approximated by polyline sampler 320, a mask (as shown in FIG. 4A) may be created by unifying the topologies of the virtual curves and the approximated contours to indicate which segments were created from virtual curves and which segments are actual contours approximated by the polyline sampler. Subsequently, the mask may be received by contour renderer 340 and used to generate bitmap 350, which is representative of glyph variant 310. Further discussion of contour renderer 340 is provided in FIGS. 4A-4B.

FIGS. 4A-4B illustrate an exemplary contour renderer 340 for generating a bitmap of a glyph variant in accordance with embodiments of the present invention. Referring initially to FIG. 4A, FIG. 4A illustrates process 400A for generating an inside-outside pixel map of the glyph variant using a ray intersection test on a mask representative of a glyph variant (e.g., received from the polyline sampler). Using a ray surface intersection test, the contour renderer 340 may emit a ray 414 to the right (or any direction) of each of a plurality of pixels 410 for the mask 412 of the glyph variant. Ray intersections with line segments of the mask 412, including virtual and actual line segments, are counted to determine whether a pixel is inside or outside the shape of the glyph variant. For example, a pixel may be determined as being located inside the glyph variant shape based on whether the number of ray intersections (excluding virtual curves) is an odd number. Results of the ray surface intersection test may then be used to render the inside-outside pixel map 420. Virtual curves are included and later excluded to allow for tensor broadcasting, which may accelerate computations as described above.

Turning to FIG. 4B, FIG. 4B illustrates process 400B for generating a rasterized representation of a glyph variant using a contour renderer in accordance with embodiments of the present invention. As discussed above in connection with FIG. 4A, an inside-outside pixel map 420 may be generated based on mask 412A using ray surface intersection tests. Further, mask 412B may be used to generate a mapping 440 of the pixel distance to a glyph variant border. The distance from each pixel to a curve of the glyph variant may be determined by computing the squared distance from each pixel to both virtual and actual segments of mask 412B. For example, the square distance from a pixel to a curve may be the minimum among the distances to all actual segments, excluding virtual segments. As mentioned above, with respect to FIG. 4A, virtual segments are included and later excluded to allow for tensor broadcasting, which may accelerate computations. The square distance from a pixel to a curve may be used to estimate the border of the glyph variant. In some embodiments, the distance may be clamped by a user-defined threshold. Bitmap 450 may be generated based on a combination of the computed squared distance of mapping 440 and the inside-outside mask 420. The data of bitmap 450 may be stored as a signed distance field. Typically, pixel values in a signed distance field represent the distance to the nearest non-black pixel in the source image. Pixels outside of the shape of the glyph have positive distance values, while pixels inside the shape of the glyph have negative distance values, hence the "signed" part of the name. For example, pixel values of area 452 may be positive, pixel values of area 456 may be negative and pixel values of area 454 may be equal to zero as pixels in area 454 make up the border of the representation of the glyph variant in bitmap 450. Lastly, to generate the final rasterized glyph variant, the contour renderer of the present disclosure may normalize the values of the signed distance field into a zero to one range creating a monochromatic (i.e., single colored) bitmap of the glyph variant.

Figure 5:
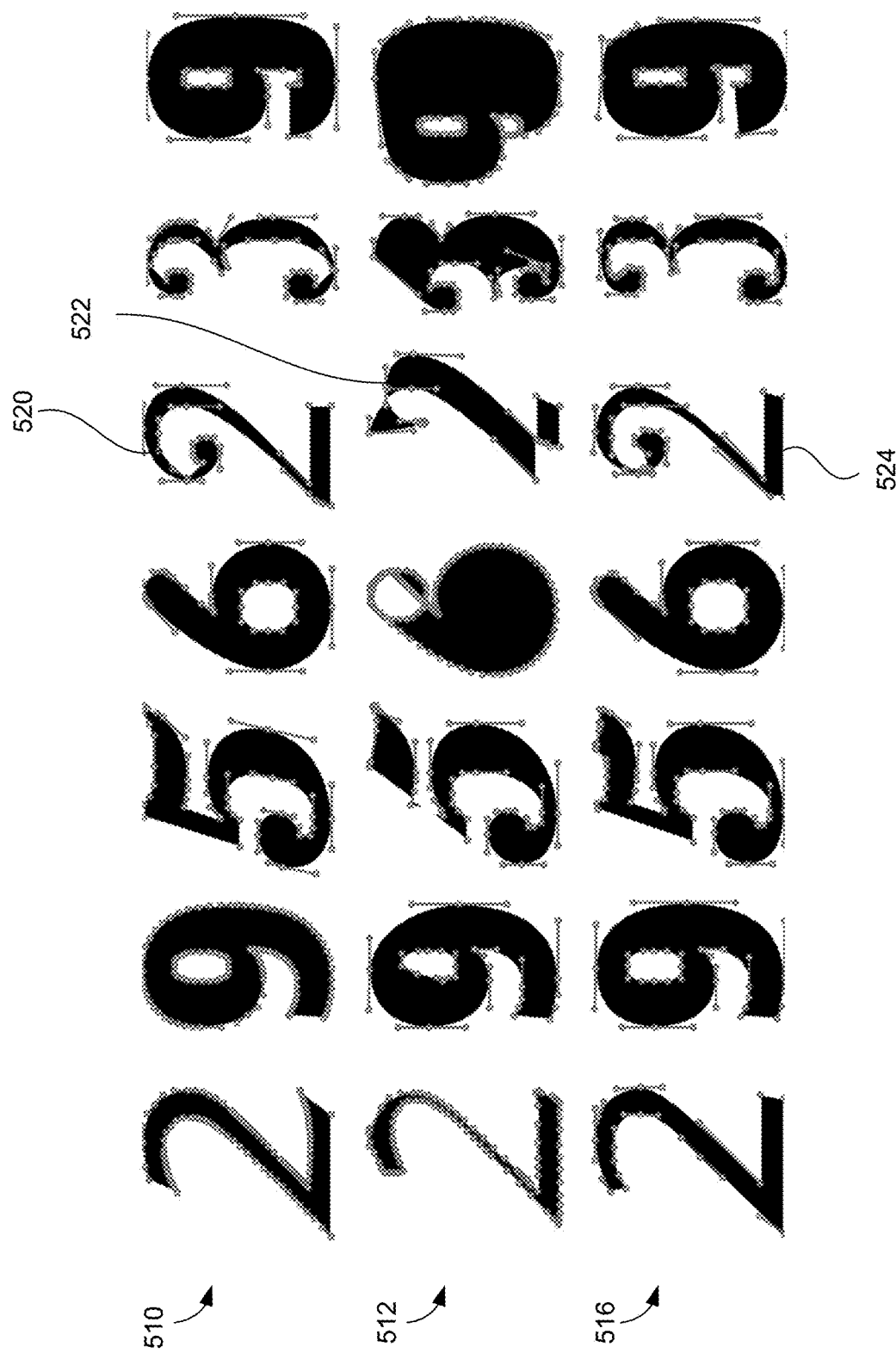
FIG. 5 illustrates exemplary rows of vector glyphs, conventional glyph variants, and glyph variants as may be produced by a font initiator, in accordance with embodiments of the present invention.

Turning to FIG. 5, FIG. 5 shows exemplary rows of vector glyphs 510, conventional glyph variants 512, and glyph variants 516 as may be produced by the font generative system as described in the present disclosure. As can be seen in FIG. 5, conventional glyph variants 512 contain errors that make the glyph variants unattractive due to discontinuities, lack of symmetry, and/or other flaws. Moreover, when comparing the row of conventional glyph variants 512 to the row of vector glyphs 510 (e.g., as a ground truth), it can be seen that certain of the conventional glyph variants 512 are drastically different from their respective character in row 510. For example, the number '2' shown at 522 appears very different from ground truth number '2' at 520. Further, glyph variant 524, as may be produced by the font generative system as described in the present disclosure appears largely similar to the ground truth 520, comprising only slight errors/variations.

Figure 6A:
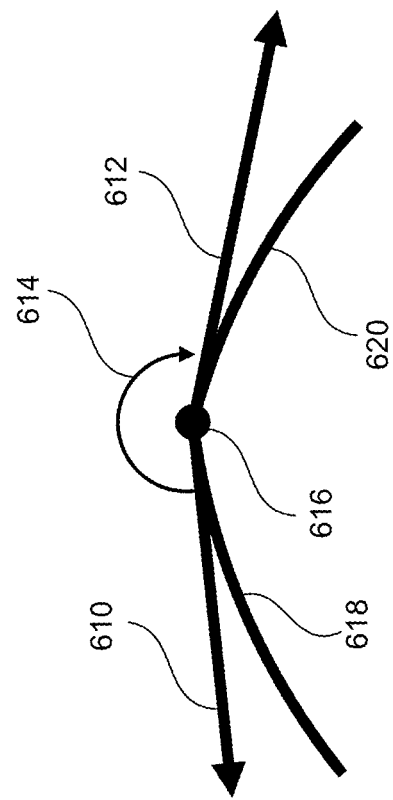
FIGS. 6A-6B illustrate an exemplary process for adjusting the location of a control point of a glyph variant, in accordance with embodiments of the present invention.
Figure 6B:
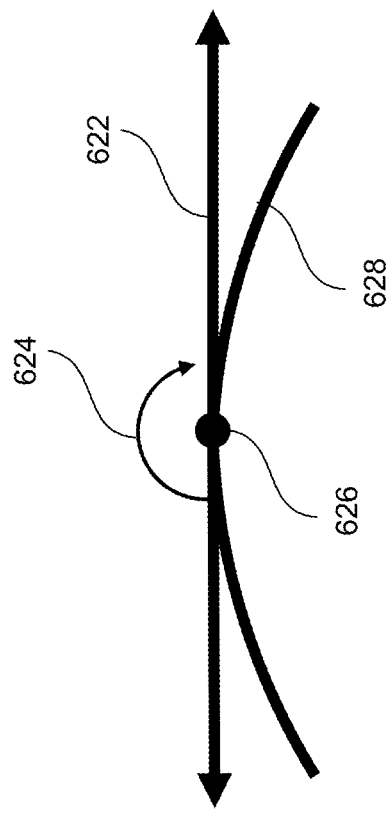

Turning to FIGS. 6A-6B, FIGS. 6A-6B illustrate an exemplary process for adjusting the location of a control point of a glyph variant. As described above in connection with FIG. 1, to rectify the curve endpoints, the control point adjuster 140 may compute a tangent line for each curve at the control point for each line segment that shares the control point. Where the two tangent lines meet, the rectifier may compute the cosine value of the angle generated by the intersection of the tangent lines. As the angle increases from 90° to 180°, the cosine increases in magnitude, but is now a negative value. Thus, the cosine goes from 0 to −1 as the angle approaches 180°. Therefore, to rectify sharp curves, endpoints may be adjusted such that the cosine approaches −1. For example, as shown in FIG. 6A, control point 616 is shared by line segments 618 and 620. Tangent line 610 may be generated at control point 616 for line segment 618 and tangent line 612 may be generated at control point 616 for line segment 620. The angle 614 may be calculated based on the intersection of tangent line 610 and 612. If the cosine value of angle 614 does not equal −1, the location of the control point 616 may be adjusted to create a single tangent line at control point 616. As shown in FIG. 6B, when angle 624 is equal to 180°, there will be a single tangent line 622 for control point 626 and curve 628 will include no sharp edges and/or corners. Advantageously, these adjustments may be used to further improve the quality of glyph variants in accordance with embodiments of the present disclosure.

Figure 7:
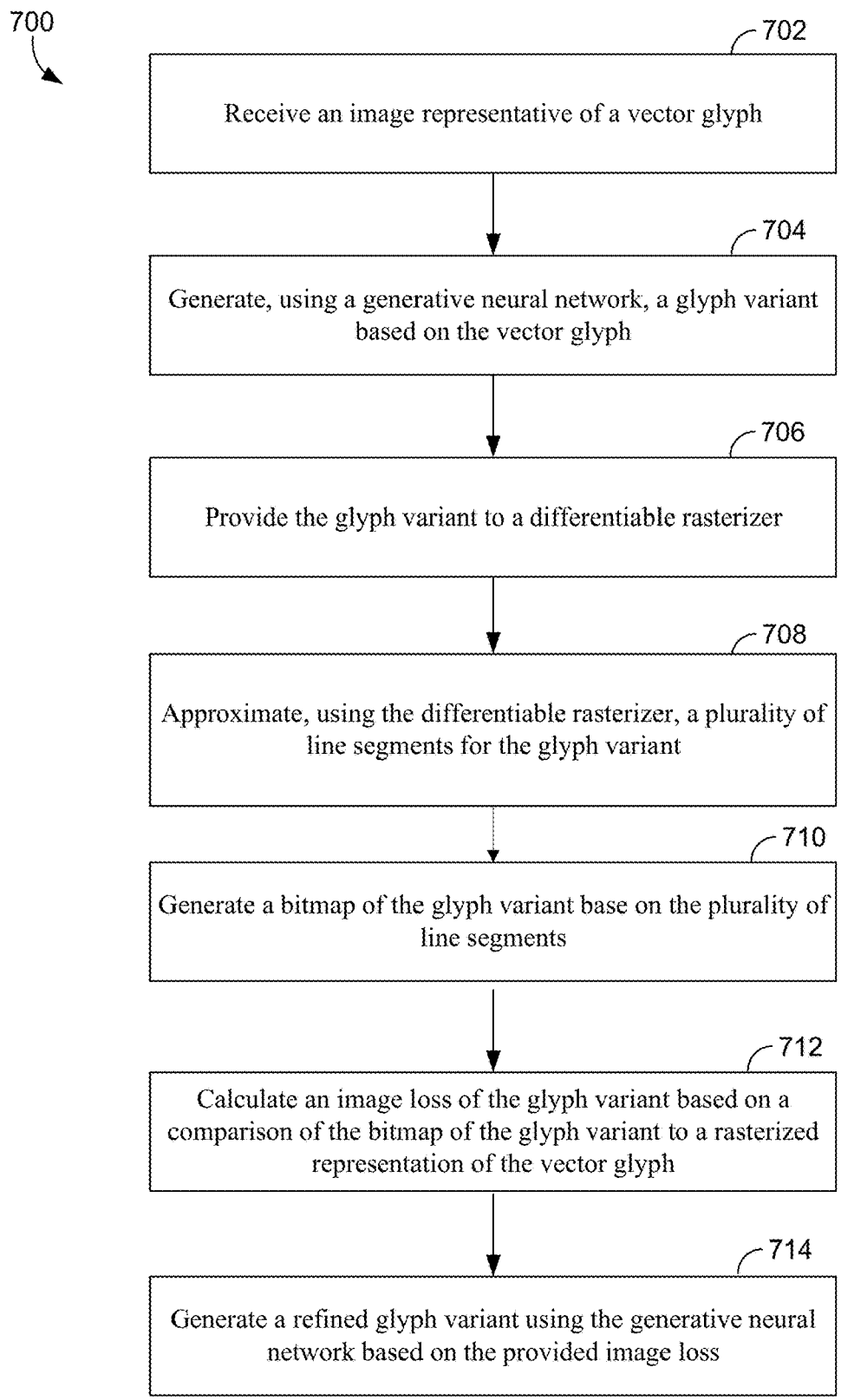
FIG. 7 is a flow diagram showing a method generating a refined glyph variant, in accordance with embodiments of the present invention.
Figure 8:
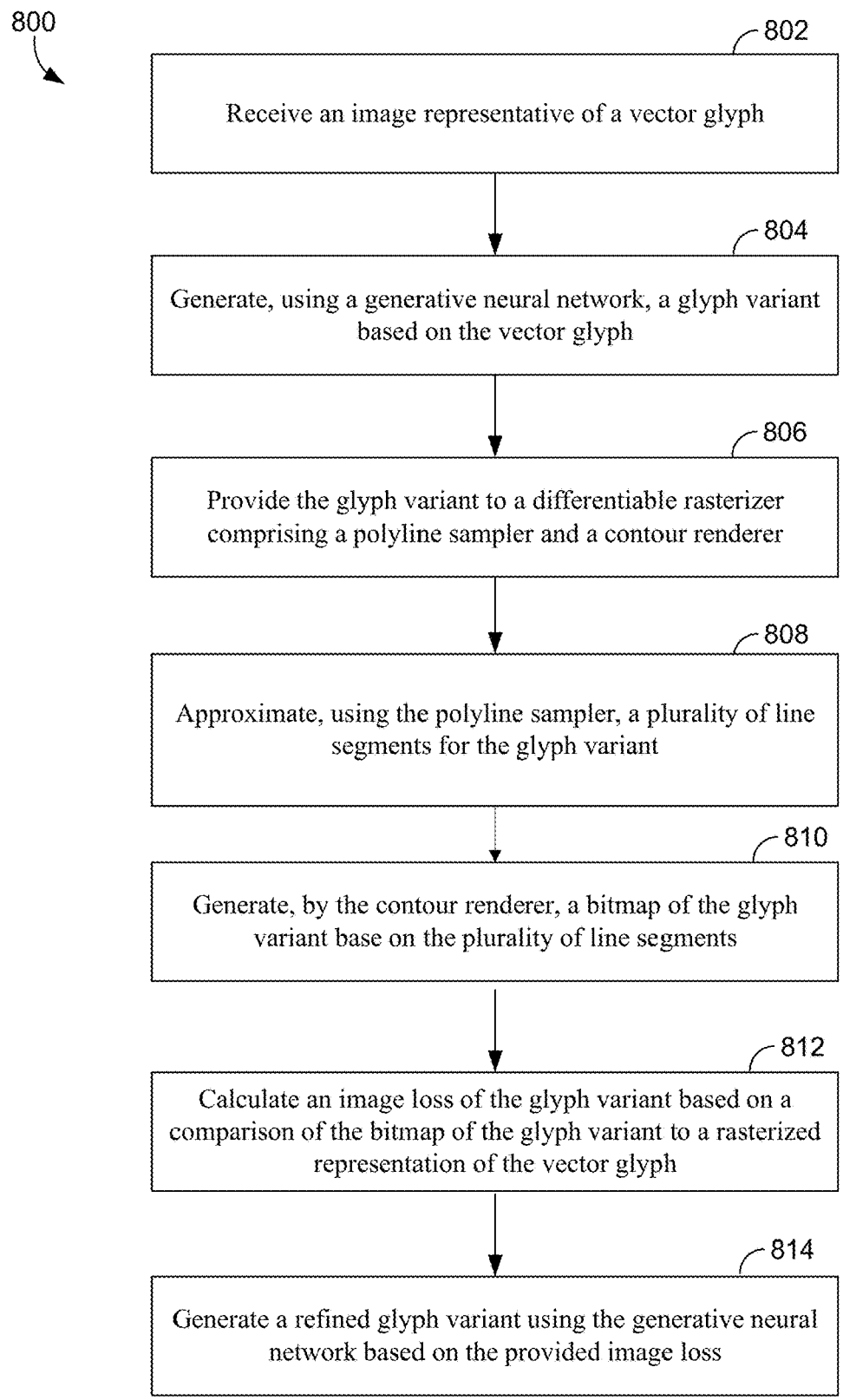
FIG. 8 is a flow diagram showing a method for generating a glyph variant, in accordance with embodiments of the present invention.
Figure 9:
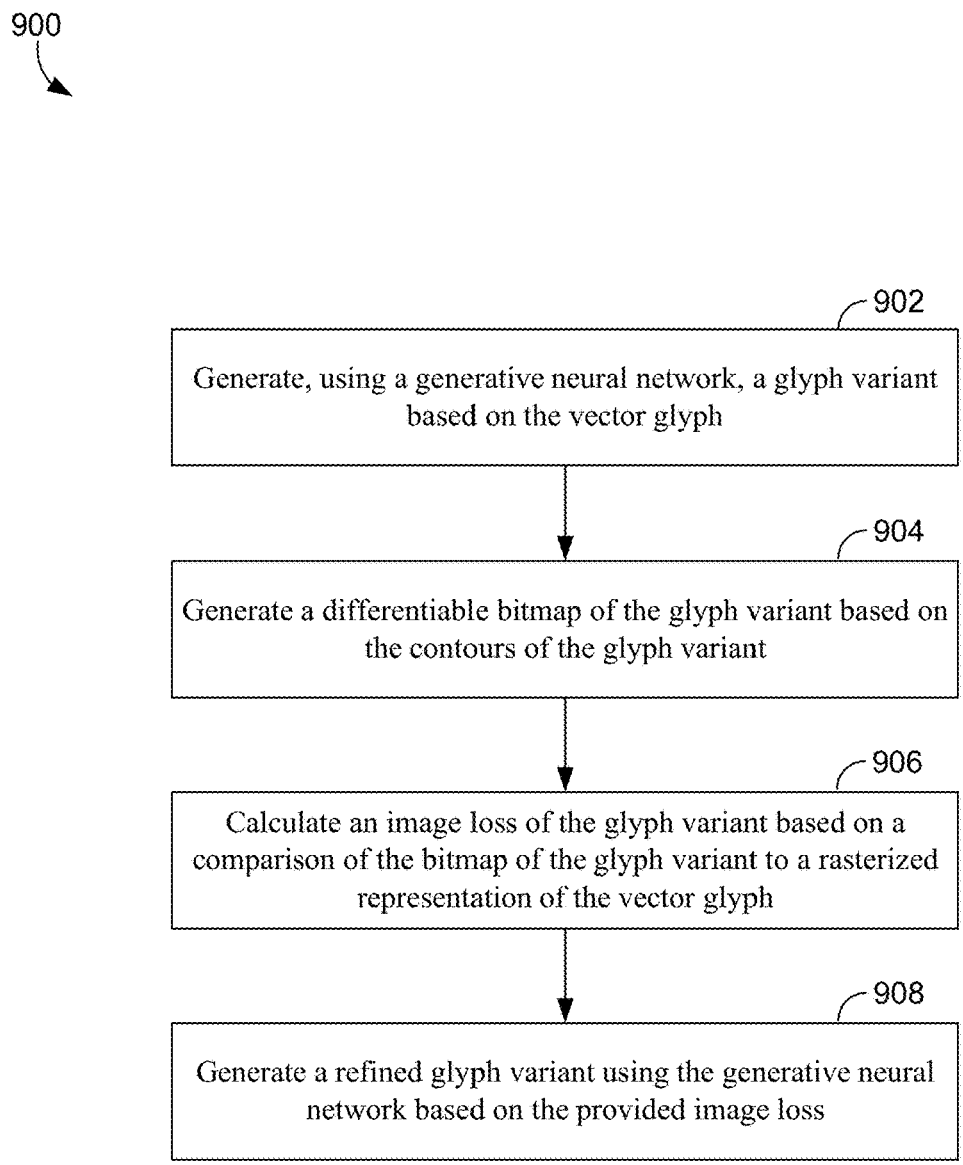
FIG. 9 is a flow diagram showing a method for generating a glyph variant, in accordance with embodiments of the present invention.

With reference to FIGS. 7, 8, and 9, flow diagrams are provided illustrating methods 700, 800, and 900 for generating glyph variants. Each block of methods 700, 800, and 900, and any other methods described herein, comprise a computing process performed using any combination of hardware, firmware, and/or software. For instance, various functions can be carried out by a processor executing instructions stored in memory. The methods can also be embodied as computer-usable instructions stored on non-transitory computer storage media. The methods can be provided by a standalone application, a service or hosted service (standalone or in combination with another hosted service), or a plug-in to another product, to name a few. The methods 700, 800, and/or 900 may be implemented by the generative font model 100 as described in conjunction with FIGS. 1-6.

With initial reference to FIG. 7, FIG. 7 illustrates a method 700, in accordance with embodiments described herein. Method 700 can be performed, for instance, by generative font model 100 of FIG. 1. Initially at block 702, an image representative of a vector glyph is received. At block 704, a glyph variant based on the vector glyph is generated using a generative neural network. At block 706, the glyph variant is provided to a differentiable rasterizer. At block 708, a plurality of line segments for the glyph variant are approximated using the differentiable rasterizer. At block 710, a bitmap of the glyph variant is generated based on the plurality of line segments. At block 712, an image loss of the glyph variant is calculated based on a comparison of the bitmap of the glyph variant to a rasterized representation of the vector glyph. At block 714, a refined glyph variant is generated using the generative neural network based on the provided image loss.

Turning to FIG. 8, FIG. 8 illustrates a method 800 in accordance with embodiments described herein. Method 800 can be performed, for instance, by generative font model 100 of FIG. 1. Initially at block 802, an image representative of a vector glyph is received. At block 804, a glyph variant based on the vector glyph is generated using a generative neural network. At block 806, the glyph variant is provided to a differentiable rasterizer comprising a polyline sampler and a contour renderer. At block 808, a plurality of line segments for the glyph variant are approximated using the polyline sampler. The plurality of line segments are representative of contours of the glyph variant. At block 810, a bitmap of the glyph variant is generated by the contour renderer based on the plurality of line segments. At block 812, an image loss of the glyph variant is calculated based on a comparison of the bitmap of the glyph variant to a rasterized representation of the vector glyph. The calculated image loss is provided to the neural network. At block 814, a refined glyph variant is generated using the generative neural network based on the provided image loss.

Turning to FIG. 9, FIG. 9 illustrates a method 900, in accordance with embodiments described herein. Method 900 can be performed, for instance, by generative font model 100 of FIG. 1. Initially at block 902, a glyph variant based on the vector glyph is generated using a generative neural network. At block 904, a differential bitmap of the glyph variant is generated based on contours of the glyph variant. At block 906, an image loss of the glyph variant is calculated based on a comparison of the bitmap of the glyph variant to a rasterized representation of the vector glyph. The glyph variant is provided to a differentiable rasterizer. At block 908, a refined glyph variant is generated using the generative neural network based on the provided image loss.

Illustrative Computing Environment

Figure 10:
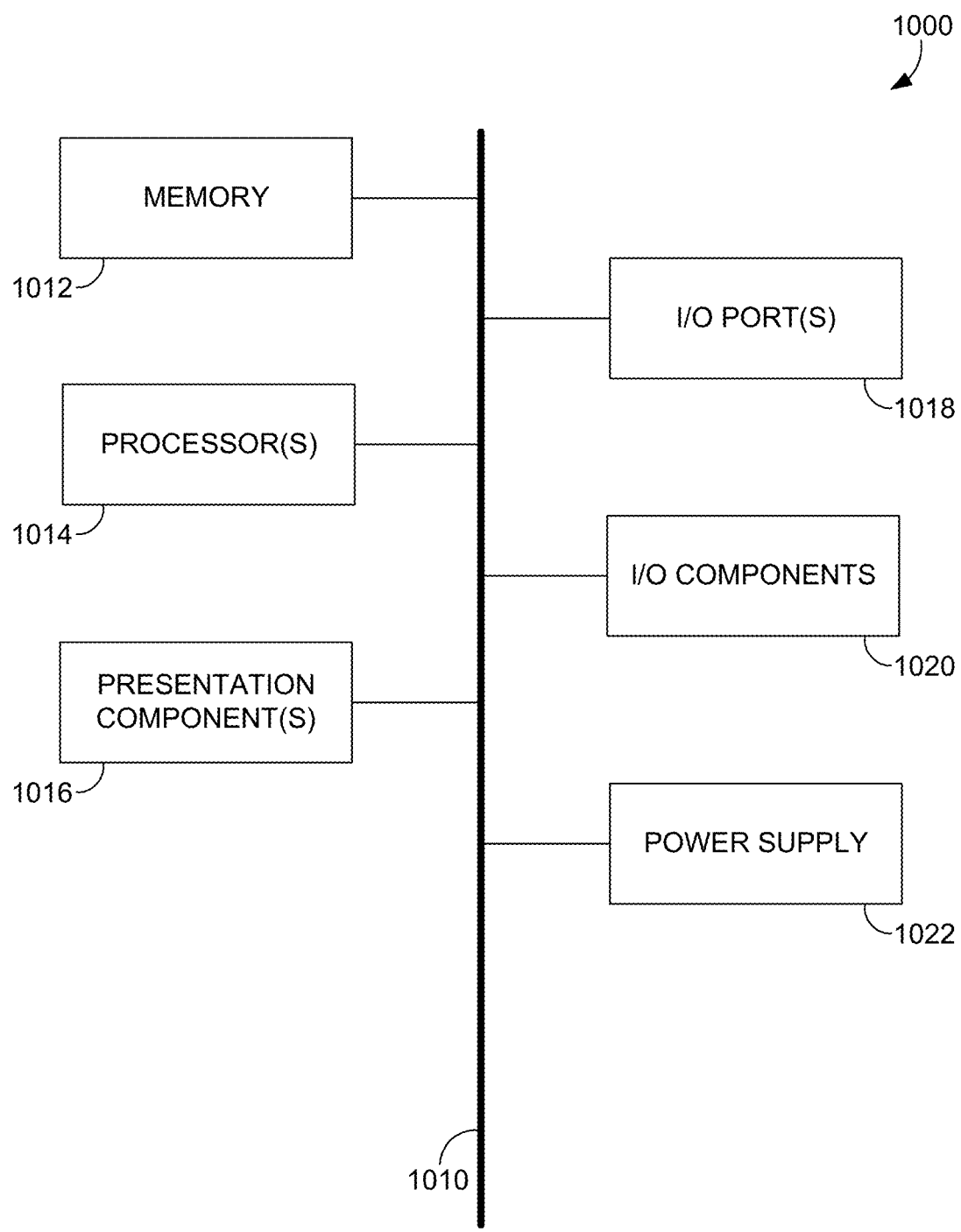
FIG. 10 is a block diagram of an exemplary operating environment in which embodiments of the present invention may be employed.

Having briefly described an overview of embodiments of the present invention, an example operating environment in which embodiments of the present invention may be implemented is described below in order to provide a general context for various aspects of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes non-transitory computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 700 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low level software written in machine code can provide more complex functionality to higher levels of software. As used herein, computer-executable instructions include any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure. It will be understood that certain features and sub-combinations are of utility and may be employed without reference to other features or sub-combinations. This is contemplated by and is within the scope of the claims.

What is claimed is:

1. A method comprising:
receiving an image representative of a vector glyph;
generating, using a generative neural network, a glyph variant based on the vector glyph;
providing the glyph variant to a differentiable rasterizer;
approximating, using the differentiable rasterizer, a plurality of line segments for the glyph variant, wherein the plurality of line segments are representative of contours of the glyph variant;
generating a bitmap of the glyph variant based on the plurality of line segments;
calculating an image loss of the glyph variant based on a comparison of the bitmap of the glyph variant to a rasterized representation of the vector glyph;
providing the image loss to the generative neural network; and
generating a refined glyph variant using the generative neural network based on the provided image loss.

2. The method of claim 1, wherein the differentiable rasterizer comprises a polyline sampler to approximate the plurality of line segments by sampling a fixed number of points on each of the plurality of line segments, and wherein the plurality of line segments comprise virtual curves representative of contours of the glyph variant.

3. The method of claim 1, wherein the differentiable rasterizer further comprises a contour renderer to generate the bitmap of the glyph variant by determining points inside the glyph variant and determining points outside the glyph variant based on a ray surface intersection test.

4. The method of claim 3, wherein the ray surface intersection test further comprises:
emitting a ray from the contour renderer;
counting line segment intersections, wherein a line segment is intersected when the ray crosses one of the plurality of line segments;
determining whether a count of line segment intersections is an odd number; and
based on determining the count of line segment intersections is an odd number, determining the pixel is inside a boundary of the glyph variant, wherein the boundary of the glyph variant is defined by the plurality of line segments.

5. The method of claim 1, wherein the rasterized representation of the vector glyph is generated using the differentiable rasterizer by approximating a plurality of line segments of the vector glyph and generating a bitmap of the vector glyph based on the plurality of line segments.

6. The method of claim 1, wherein calculating the image loss of the glyph variant further comprises:
rendering the bitmap of the glyph variant and rasterized representation of the vector glyph in a common viewport; and
calculating a pixel variance between the bitmap of the glyph variant and the rasterized representation of the vector glyph.

7. The method of claim 1, further comprising:
calculating an angle between two of the plurality of line segments meeting at an endpoint of the glyph variant;
determining the angle exceeds a threshold angle; and
adjusting the location of the endpoint of the glyph variant such that the angle between the two of the plurality of line segments approximates 180 degrees.

8. One or more non-transitory computer storage media storing computer-useable instructions that, when executed by a computing device, cause the computing device to perform operations comprising:
receiving an image representative of a vector glyph;
generating, using a generative neural network, a glyph variant based on the vector glyph;
providing the glyph variant to a differentiable rasterizer comprising a polyline sampler and a contour renderer;
approximating, using the polyline sampler, a plurality of line segments for the glyph variant, wherein the plurality of line segments are representative of contours of the glyph variant;
generating, using the contour renderer, a bitmap of the glyph variant based on the plurality of line segments;
calculating an image loss of the glyph variant based on a comparison of the bitmap of the glyph variant to a rasterized representation of the vector glyph;
providing the image loss to the neural network; and
generating a refined glyph variant using the generative neural network based on the provided image loss.

9. The non-transitory computer storage media of claim 8, wherein the polyline sampler approximates the plurality of line segments by sampling a fixed number of points on each of the plurality of line segments, and wherein the plurality of line segments comprise virtual curves representative of contours of the glyph variant.

10. The non-transitory computer storage media of claim 8, wherein the contour renderer generates the bitmap of the glyph variant by determining points inside the glyph variant and determining points outside the glyph variant based on a ray surface intersection test.

11. The non-transitory computer storage media of claim 10, wherein the ray surface intersection test further comprises:
emitting a ray from the contour renderer;
counting line segment intersections, wherein a line segment is intersected when the ray crosses one of the plurality of line segments;
determining whether a count of line segment intersections is an odd number; and
based on determining the count of line segment intersections is an odd number, determining the pixel is inside a boundary of the glyph variant, wherein the boundary of the glyph variant is defined by the plurality of line segments.

12. The non-transitory computer storage media of claim 8, wherein the rasterized representation of the vector glyph is generated using the differentiable rasterizer by approximating a plurality of line segments of the vector glyph and generating a bitmap of the vector glyph based on the plurality of line segments.

13. The non-transitory computer storage media of claim 8, wherein calculating the image loss of the glyph variant further comprises:
rendering the bitmap of the glyph variant and rasterized representation of the vector glyph in a common viewport; and
calculating a pixel variance between the bitmap of the glyph variant and the rasterized representation of the vector glyph.

14. The non-transitory computer storage media of claim 8, further comprising:

calculating an angle between two of the plurality of line segments meeting at an endpoint of the glyph variant;

determining the angle exceeds a threshold angle; and adjusting the location of the endpoint of the glyph variant such that the angle between the two of the plurality of line segments approximates 180 degrees.

15. A computer system comprising:

one or more hardware processors and memory configured to provide computer program instructions to the one or more hardware processors;

a generative font system configured to use the one or more hardware processors, the generative font system comprising:

means for generating, using a generative neural network, a glyph variant based on a vector glyph;

means for generating a differentiable bitmap of the glyph variant based on contours of the glyph variant;

means for calculating an image loss of the glyph variant based on a comparison of the bitmap of the glyph variant to a rasterized representation of the vector glyph;

means for providing the image loss to the neural network; and means for generating a refined glyph variant using the generative neural network based on the provided image loss.

16. The computer system of claim 15, wherein the glyph variant is provided to a differentiable rasterizer that comprises a polyline sampler which approximates a plurality of line segments by sampling a fixed number of points on each of the plurality of line segments, wherein the plurality of line segments comprise virtual curves representative of contours of the glyph variant.

17. The computer system of claim 16, wherein the differentiable rasterizer further comprises a contour renderer to generate the bitmap of the glyph variant by determining points inside the glyph variant and determining points outside the glyph variant based on a ray surface intersection test.

18. The computer system of claim 17, wherein the ray surface intersection test further comprises:

emitting a ray from the contour renderer;

means for counting line segment intersections, wherein a line segment is intersected when the ray crosses one of the plurality of line segments;

means for determining whether a count of line segment intersections is an odd number; and based on determining the count of line segment intersections is an odd number, means for determining the pixel is inside a boundary of the glyph variant, wherein the boundary of the glyph variant is defined by the plurality of line segments.

19. The computer system of claim 15, wherein the rasterized representation of the vector glyph is generated using a differentiable rasterizer by approximating a plurality of line segments of the vector glyph and generating a bitmap of the vector glyph based on the plurality of line segments.

20. The computer system of claim 15, wherein calculating the image loss of the glyph variant further comprises:

means for rendering the differential bitmap of the glyph variant and the rasterized representation of the vector glyph in a common viewport; and means for calculating a pixel variance between the differential bitmap of the glyph variant and the rasterized representation of the vector glyph.

* * * * *